United States Patent
Mucklejohn et al.

Patent Number: 5,086,258
Date of Patent: Feb. 4, 1992

[54] DISCHARGE TUBE ARRANGEMENT

[75] Inventors: Stuart A. Mucklejohn, Leicester; David O. Wharmby, Loughborough, both of England

[73] Assignee: Thorn EMI plc, London, England

[21] Appl. No.: 592,491

[22] Filed: Oct. 4, 1990

[30] Foreign Application Priority Data

Oct. 11, 1989 [GB] United Kingdom ............. 8922862

[51] Int. Cl.$^5$ ............................................. H05B 41/16
[52] U.S. Cl. ........................................ 315/248; 315/39; 313/638; 313/607
[58] Field of Search ............... 315/248, 39, 169.4; 313/586, 587, 638–642, 234, 607

[56] References Cited

U.S. PATENT DOCUMENTS

| | | | |
|---|---|---|---|
| 3,620,838 | 11/1971 | Peehs | 313/346 R |
| 3,769,544 | 10/1973 | Miller | 313/579 |
| 3,996,489 | 11/1976 | Byrum | 313/587 |
| 4,114,064 | 9/1978 | Ernsthausen | 313/586 |
| 4,205,392 | 5/1980 | Byrum | 315/169.4 |
| 4,792,725 | 12/1988 | Levy | 315/39 |

*Primary Examiner*—Eugene R. LaRoche
*Assistant Examiner*—Amir Zarabian
*Attorney, Agent, or Firm*—Fleit, Jacobson, Cohn, Price, Holman & Stern

[57] ABSTRACT

An electrodeless discharge tube containing a fill which comprises a metal carbonyl complex. Such a complex will be sufficiently volatile to produce a vapor pressure in a discharge tube in which a discharge can be generated. The discharge so generated emits a mixture of visible and infra-red radiation.

7 Claims, 1 Drawing Sheet

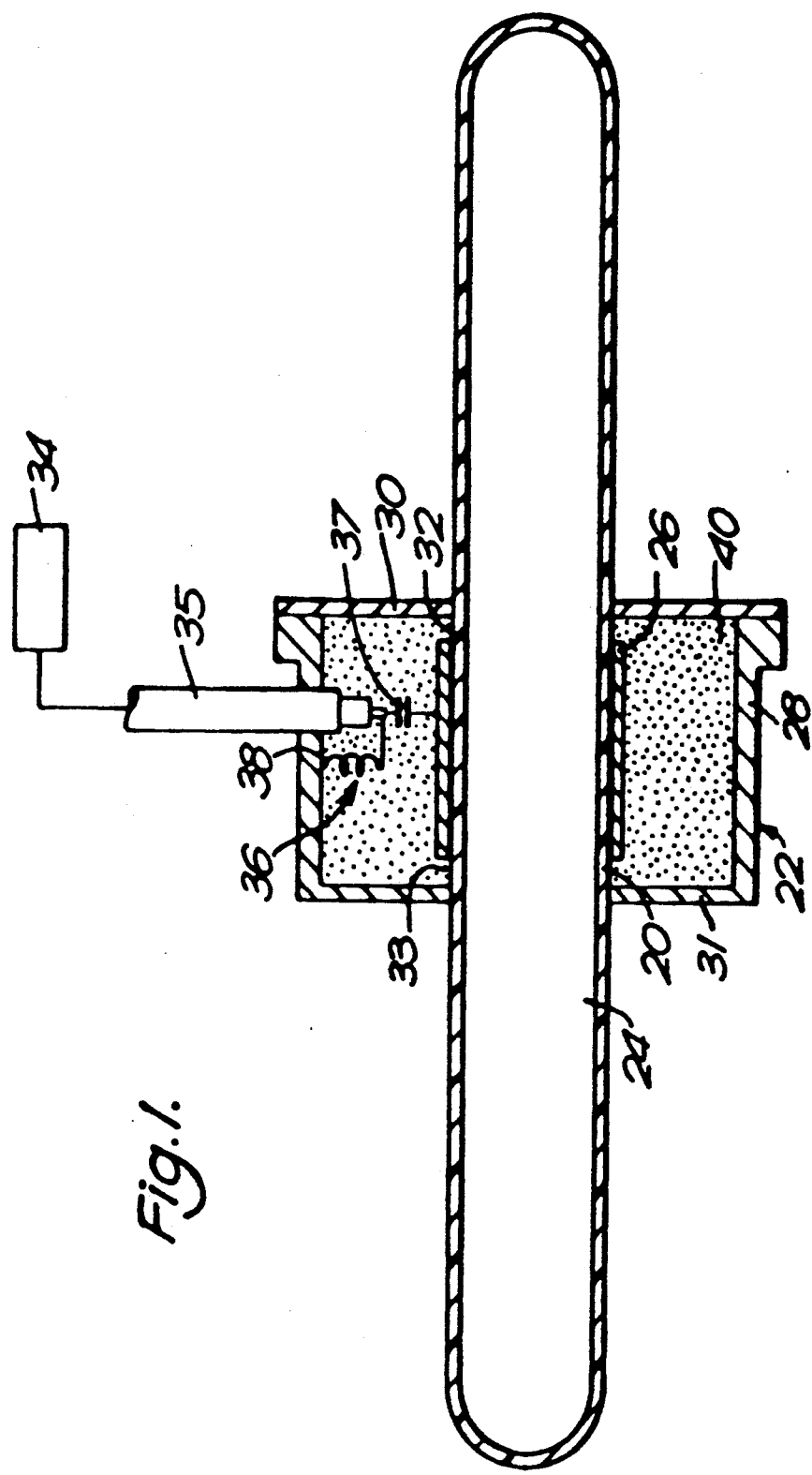

DISCHARGE TUBE ARRANGEMENT

FIELD OF THE INVENTION

This invention relates to a discharge tube arrangement and in particular to such an arrangement for use as a light source.

BACKGROUND OF THE INVENTION

It is known, e.g. as disclosed in EP 0225753A2 (University of California), to generate and sustain a low pressure discharge in a gas by using electromagnetic surface waves. Surface waves are created by an energizer (also known as a launcher) which is positioned around and external of, but not extending the whole length of, a discharge tube containing the gas. In such an arrangement, it is not necessary to provide electrodes inside the discharge tube. The power to generate the electromagnetic wave is provided by a radio frequency (r.f.) power generator.

It is proposed that such an arrangement be used as a visible light or a UV source. To provide a visible light source, the discharge tube could be a generic fluorescent lamp discharge tube containing a mix of inert gases and mercury vapour (e.g. argon gas and mercury vapour) and having on its inner surface a phosphor which converts 254 nm U.V. radiation to visible light. To provide a U.V. source, the discharge tube could be a generic germicidal or curing lamp discharge tube constructed of quartz glass and containing a mix of inert gases and mercury vapour, but with no phosphor.

Our copending British Patent Application (Agents Ref. PQ 50316) discloses such an arrangement in which the fill contains a metal halide. On excitation by a surface wave, a discharge is generated which produces visible light.

SUMMARY OF THE INVENTION

A first aspect of the present invention provides an electrodeless discharge tube containing a fill which comprises a metal carbonyl complex. The inventors have appreciated that such a complex will be sufficiently volatile to produce a vapour pressure in a discharge tube in which a discharge can be generated. The discharge so generated emits a mixture of visible and infra-red radiation. The inventors believe the infra-red emission to be due to the presence of the carbonyl group.

The metal carbonyl complex may consist of a metal atom and a plurality of carbonyl ligands. Alternatively, it is envisaged that the metal carbonyl complex may consist of a metal atom, a plurality of carbonyl ligands and one or more halide ligands.

The present invention also provides a discharge tube arrangement comprising an electrodeless discharge tube according to said first aspect and means for supplying r.f. power to the discharge tube. In a preferred embodiment, the means for supplying r.f. power comprises a launcher and an r.f. power generator.

BRIEF DESCRIPTION OF THE DRAWINGS

Embodiments of the present invention will now be described, by way of example only, and with reference to the accompanying drawing which shows a cross-sectional view of a discharge tube arrangement provided in accordance with the present invention.

DETAILED DESCRIPTION OF THE PREFERRED EMBODIMENT

As shown in FIG. 1, a discharge tube arrangement comprises a discharge tube 20 mounted in a launcher 22. The discharge tube 20 is formed of a light-transmissive, dielectric material, such as glass, and contains a fill 24.

The launcher 22 is made of an electrically conductive material, such as brass, and formed as a coaxial structure comprising an inner tube 26 and an outer tube 28. A first plate 30, at one end of the outer tube, provides a first end wall for the launcher structure. At the other end of the outer tube 28, a second plate 31, integral with the outer tube 28, provides a second end wall. The inner tube 26 is shorter than the outer tube 28 and so positioned within the outer tube 28 as to define a first annular gap 32 and a second annular gap 33. Each of the first plate 30 and second plate 31 has an aperture for receiving the discharge tube 20. The outer tube 28, the first plate 30 and the second plate 31 form an unbroken electrically conductive path around, but not in electrical contact with, the inner tube 26 to provide an r.f. screening structure therearound.

Suitable dimensions for the launcher of FIG. 1 are as follows:

| | | |
|---|---|---|
| Launcher length | 7–20 mm | |
| Launcher diameter (outer tube 28 diameter) | 25–35 mm | but depends on size of discharge tube 20. |
| Inner tube 26 length | 3–18 mm | |
| Inner tube 26 diameter | 13 mm | but depends on size of discharge tube 20. |
| Length of Launching gap (first gap 32) | 0.5–3 mm | |
| Length of second gap 33 | 1–10 mm | |

The thickness of the electrically conductive material is of the order of millimeters, or less, depending on the construction method used.

An r.f. power generator 34 (shown schematically) is electrically connected to the inner tube 26 of the launcher 22 via a coaxial cable 35 and an impedance matching network 36 (shown schematically as comprising capacitor 37 and inductor 38). The r.f. power generator 34, the impedance matching network 36, the coaxial cable 35 and the launcher 22 constitute an r.f. powered excitation device to energise the fill to produce a discharge.

A body 40 of dielectric material inside the launcher 22 is provided as a structural element, to keep the size of the gaps 32, 33 constant and to hold the inner tube 26 in position. The body 40 also helps in shaping the electric field in the gaps 32, 33 for ease of starting or other purposes. Suitable dielectric materials which exhibit low loss at r.f. frequencies include glass, quartz and PTFE. Alternatively, the launcher may be partially or completely air filled, provided that means to support the inner tube are provided.

When the r.f. power supply 34 is switched on, an oscillating electric field, having a frequency typically in the range of from 1 MHz to 1 GHz, is set up inside the launcher 22. At the first and second gaps 32, 33, this electric field is parallel to the longitudinal axis of the discharge tube 20. If sufficient power is applied, the consequent electric field produced in the fill 24 is sufficient to create a discharge through which an electromagnetic surface wave may be propagated in a similar manner to the arrangement of EP 0225753A2. Accordingly, the launcher 22 powered by the r.f. power generator 34 creates and sustains a discharge in the fill—the length and brightness of the discharge depending, inter alia, on the size of the discharge tube 20 and the power applied by the r.f. power generator 34. Such a discharge tube arrangement may therefore be used as a source of radiation.

In the first embodiment, the fill 24 consisted of the hexacarbonyl chromium complex ($Cr(CO)_6$) and argon. In a second embodiment, the fill 24 consisted of the hexacarbonyl tungsten complex ($W(CO)_6$) and argon. In both embodiments, a stable surface wave discharge was achieved with the generation of a mixture of infrared and visible radiation. It is envisaged that these embodiments may have applications in the field of lighting. In each case, the fill typically contained 20 mg of the metal carbonyl.

The inventors found that mercury could advantageously be added to the $W(CO)_6$ fill to assist in starting.

It is envisaged that fills containing other metal carbonyl complexes will be excited by surface waves with the emission of a mixture of visible and infra-red radiation. Examples of such metal carbonyl complexes include the following:

| | |
|---|---|
| Hexacarbonyl molybdenum | $Mo(CO)_6$ |
| Nonacarbonyl di-iron | $Fe_2(CO)_9$ |
| Pentacarbonyl iron | $Fe(CO)_5$ |
| Hexacarbonyl vanadium | $V(CO)_6$ |
| Hexacarbonyl osmium | $Os(CO)_6$ |
| Tetracarbonyl nickel | $Ni(CO)_4$ |
| Octocarbonyl dicobalt | $Co_2(CO)_8$ |
| -continued | |
| Decacarbonyl dimanganese | $Mn_2(CO)_{10}$ |

It is also envisaged that the spectrum of radiation emitted can be modified by using halogen in the form of the metal carbonyl halide eg $Mn(CO)_5I$.

We claim:

1. A discharge tube arrangement comprising an electrodeless discharge tube and means for supplying r.f. power to the discharge tube, said discharged tube containing a fill which comprises a metal carbonyl complex.

2. A discharge tube arrangement according to claim 1 wherein the metal carbonyl complex consists of a metal atom and a plurality of carbonyl ligands.

3. A discharge tube arrangement according to claim 2 wherein the fill comprises hexacarbonyl chromium ($Cr(CO)_6$) and a noble gas.

4. A discharge tube arrangement according to claim 2 wherein the fill comprises hexacarbonyl tungsten ($W(CO)_6$) together with a noble gas and mercury.

5. A discharge tube arrangement according to claim 1 wherein the metal carbonyl complex consists of a metal atom, a plurality of carbonyl ligands and one or more halide ligands.

6. A discharge tube arrangement according to claim 1 wherein said means for supplying r.f. power comprises a launcher and an r.f. power generator.

7. An electrodeless discharge tube for use in an electrodeless discharge tube arrangement comprising an electrodeless discharge tube and means for supplying r.f. power to the discharge tube, said discharge tube containing a fill which comprises a metal carbonyl complex consisting of a metal atom, a plurality of carbonyl ligands and optionally one or more halide ligands.

* * * * *